United States Patent [19]

Kammeraad

[11] 3,968,587
[45] July 13, 1976

[54] DOWNRIGGER
[75] Inventor: James Allen Kammeraad, Holland, Mich.
[73] Assignee: DFK Inc., Holland, Mich.
[22] Filed: July 21, 1975
[21] Appl. No.: 597,412

[52] U.S. Cl. .............................. 43/27.4; 43/21.2; 43/43.12; 242/106
[51] Int. Cl.² .................................... A01K 89/00
[58] Field of Search .............. 43/43.12, 21.2, 27.4; 242/106

[56] References Cited
UNITED STATES PATENTS

| | | | |
|---|---|---|---|
| 2,580,130 | 12/1951 | Rowdon | 43/21.2 |
| 3,516,190 | 6/1970 | Cook | 43/21.2 |
| 3,719,331 | 3/1973 | Harsch | 43/43.12 X |
| 3,844,058 | 10/1974 | King | 43/27.4 |
| 3,910,524 | 10/1975 | Ireland | 43/43.12 X |

Primary Examiner—Louis G. Mancene
Assistant Examiner—Daniel J. Leach
Attorney, Agent, or Firm—Malcolm R. McKinnon

[57] ABSTRACT

A downrigger for use in maintaining terminal fishing tackle at a desired depth in the water, the downrigger including a base housing indexably mounted on a base adapted to be fixed to a water craft, the base housing carrying a telescoping extensible boom which may be moved to an unobtrusive position when not in use and which also incorporates improved means for preventing jamming of the trolling weight cable during trolling operations. The base housing also carries a cable reel having a single crank handle readily adaptable for either right or left hand use, and the base housing includes means for securely holding a fishing rod during trolling operations while permitting the fishing rod to be easily and quickly released from the downrigger when a fish strikes.

10 Claims, 17 Drawing Figures

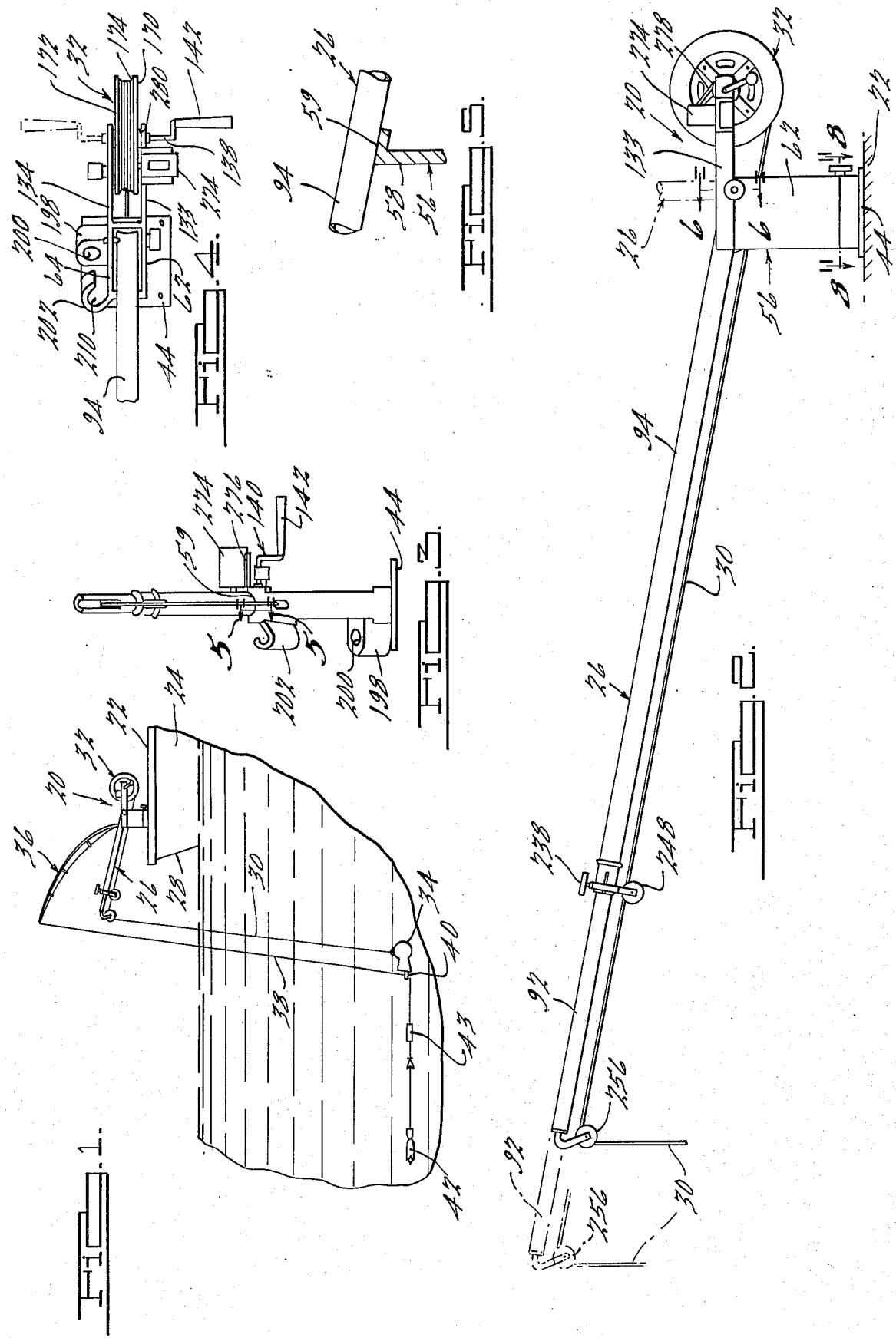

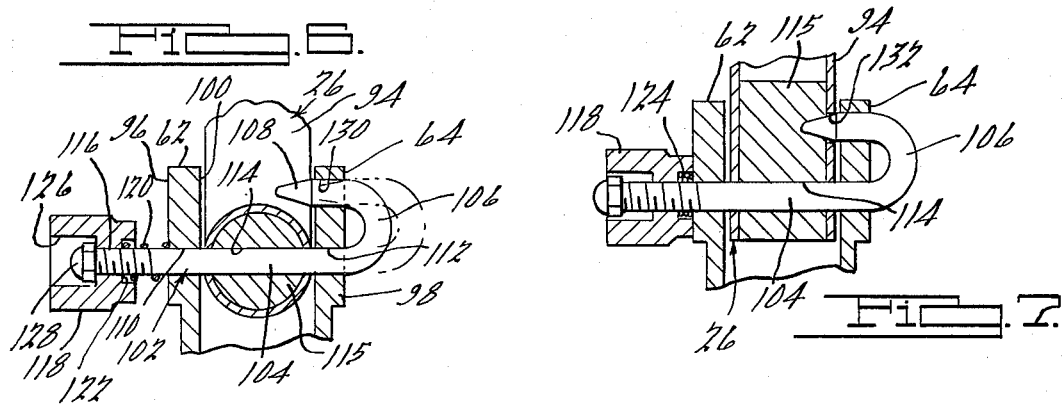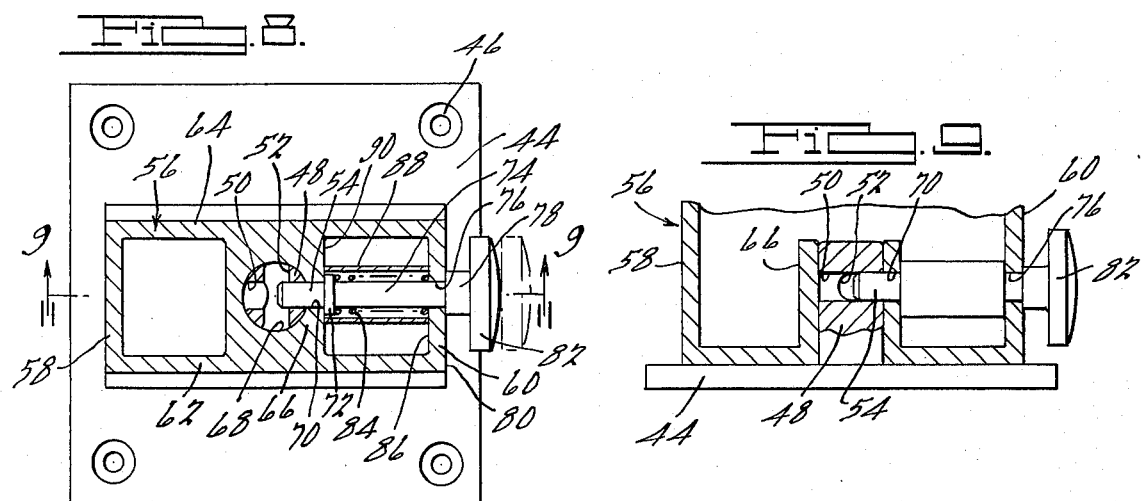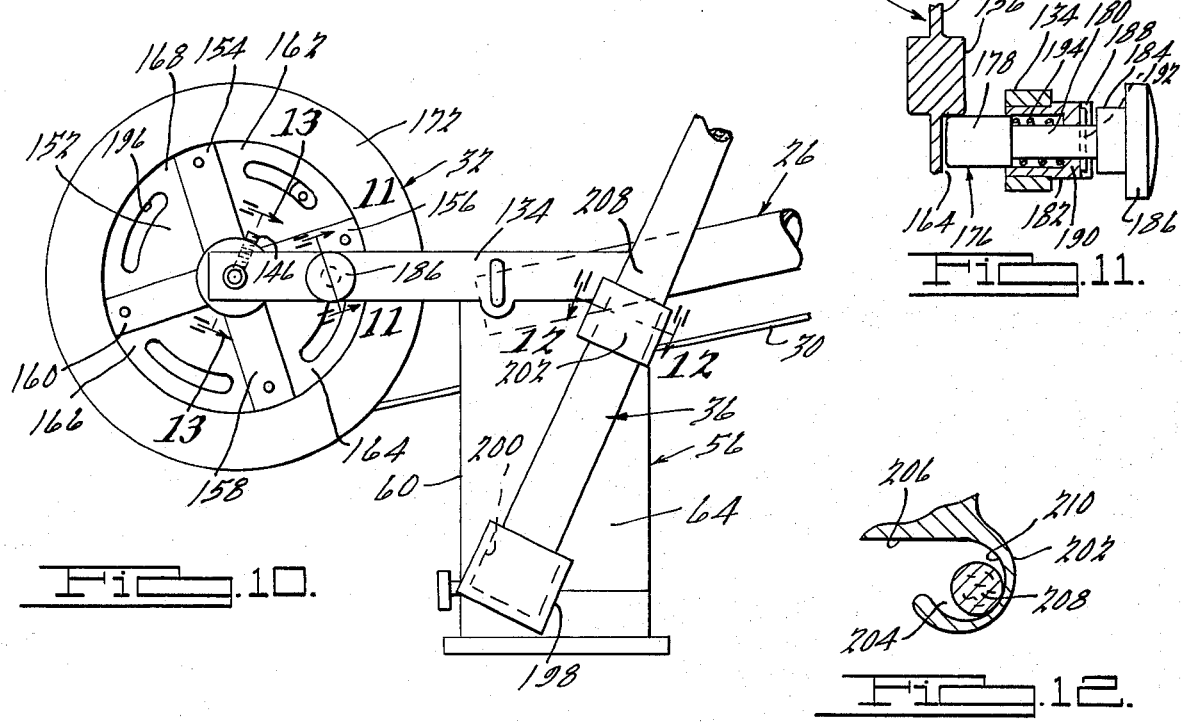

DOWNRIGGER

BRIEF SUMMARY OF THE INVENTION

This invention relates to fishing equipment and, more particularly, to an improved downrigger for use in trolling wherein a trolling weight is utilized to maintain terminal fishing tackle, including a lure or bait, at a desired depth in the water during trolling operations.

Heretofore, downriggers have been utilized in trolling for various species of game fish. In utilizing such downriggers, a fishing line leading from a fishing rod and reel is releasably attached to a trolling weight after which the trolling weight is lowered through the agency of a downrigger cable to the desired water depth and temperature where either fresh or salt water species of game fish are likely to be located. The trolling weight functions to maintain the terminal fishing tackle including the lure or bait (which is attached to the fishing line) at the desired depth in the water during the trolling operation, and when a fish strikes the lure or bait, the fishing line is automatically released from the trolling weight through the agency of a "line release" thereby separating the fishing line from the trolling weight so that the fisherman can play and land the fish with full rod and reel action and without the encumberance of the trolling weight. However, prior downriggers of the indicated character typically have been subject to a number of deficiencies. For example, many prior downriggers cannot be utilized in rough water, or where severe wave action is encountered which may cause excessive pitching, yawing or rolling of the boat, without the possibility of severe damage to the downrigger or to the deck or transom of the boat on which the downrigger is mounted. Other prior downriggers of the indicated character cannot be moved conveniently to an unobtrusive position when the downriggers are not in use, as for example, during fueling operations at a fueling dock, with the result that such prior downriggers often inhibit maneuvering of the boat in close quarters. In addition, prior downriggers of the indicated character conventionally do not provide means for securely holding a fishing rod during the trolling operation and still permit the fishing rod to be easily and quickly released from the downrigger when a fish strikes the lure or bait. Still other prior downriggers require separate models to be provided for left and right hand use and cannot be easily converted for use by either right handed or left handed persons.

An object of the present invention is to overcome the aforementioned as well as other disadvantages in prior downriggers of the indicated character and to provide an improved downrigger incorporating improved means facilitating the use of a trolling weight to maintain terminal fishing tacking including a lure or bait at a desired water depth.

Another object of the invention is to provide an improved downrigger incorporating improved means for preventing jamming of the trolling weight cable during trolling operations.

Another object of the invention is to provide an improved downrigger incorporating improved means for securely holding a fishing rod during trolling operations and which permits the fishing rod to be easily and quickly released from the downrigger when a fish strikes the lure or bait.

Another object of the invention is to provide an improved downrigger having a telescoping and extensible boom which may be locked in an unobtrusive position when not in use, which may be swung and locked in various positions facilitating stern as well as side trolling, which may, if desired, be used as an outrigger for trolling the top of the water, and which may be extended and utilized in rough water or where severe wave action is encountered without damage to the downrigger or to the deck, transom or other components of the boat on which the downrigger is mounted.

Another object of the invention is to provide an improved downrigger which can be easily and quickly mounted for either left hand or right hand manual operation thereby eliminating the necessity of providing left and right hand models.

Another object of the invention is to provide an improved downrigger which may be easily and quickly mounted on and/or removed from the deck of a boat or other water craft thereby facilitating easy storage of the downrigger when the downrigger is not in use.

Still another object of the invention is to provide an improved downrigger that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a side elevational view of a downrigger embodying the present invention, showing the same mounted in the stern section of a boat and also illustrating the manner in which the downrigger is utilized in conjunction with a fishing rod, fishing line, trolling weight and associated quick release mechanism and terminal fishing tackle;

FIG. 2 is an enlarged side elevational view of the downrigger illustrated in FIG. 1;

FIG. 3 is a front elevational view of the downrigger illustrated in FIG. 1;

FIG. 4 is a fragmentary top plan view of the downrigger illustrated in FIG. 1;

FIG. 5 is an enlarged cross-sectional view of a portion of the structure illustrated in FIG. 3, taken on the line 5—5 thereof;

FIG. 6 is a transverse cross-sectional view of a portion of the structure illustrated in FIG. 2, taken on the line 6—6 thereof, and illustrating the downrigger boom in the locked trolling position;

FIG. 7 is a cross-sectional view, similar to FIG. 6, and illustrating the downrigger boom in the upright locked position;

FIG. 8 is a cross-sectional view of the structure illustrated in FIG. 2, taken on the line 8—8 thereof;

FIG. 9 is a fragmentary cross-sectional view of the structure illustrated in FIG. 8, taken on the line 9—9 thereof;

FIG. 10 is a fragmentary elevational view illustrating the other side of the downrigger illustrated in FIG. 2;

FIG. 11 is a cross-sectional view of a portion of the structure illustrated in FIG. 10, taken on the line 11—11 thereof;

FIG. 12 is a cross-sectional view of a portion of the structure illustrated in FIG. 10, taken on the line 12—12 thereof;

DETAILED DESCRIPTION

Figure 13:
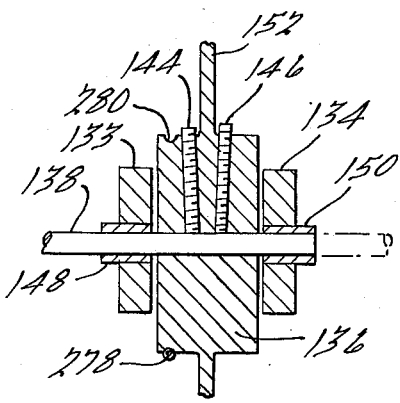
FIG. 13 is a cross-sectional view of a portion of the structure illustrated in FIG. 10, taken on the line 13—13 thereof.

Referring to the drawings, and more particularly to FIG. 1 thereof, a downrigger, generally designated 20, embodying the present invention is illustrated therein, the downrigger 20 being shown mounted on the deck 22 of the stern section of a boat 24 whereby the telescoping extensible boom, generally designated 26, of the downrigger 20 projects rearwardly over the transom 28 of the boat 24. As shown in FIG. 1, the downrigger 20 includes a cable 30 which may be of any desired length and strength, as for example, approximately 200 feet in length with a tensile strength of approximately 135 pounds. The cable may be fabricated of any desired or conventional material, such as stainless steel, and the cable is wound on a reel, generally designated 32, the free end of the cable being secured to a conventional trolling weight 34 by any desired or conventional means such as a snap swivel. As will be described hereinafter in greater detail, the downrigger 20 is adapted to releasably hold a conventional fishing rod and reel 36 having a fishing line 38 which, during trolling operations, is releasably secured to the trolling weight 34 through the agency of a conventional quick release mechanism 40 which may be of any desired or conventional type and which will automatically release the fishing line 38 from the trolling weight 34 when a fish strikes a conventional lure or bait, such as 42, which may be included in the terminal fishing tackle secured to the terminal end portion of the fishing line 38 in a conventional manner, the terminal fishing tackle also often including a dodger, such as 43, usually disposed forwardly of the lure or bait 42. As previously mentioned, the trolling weight 34 functions to maintain the terminal fishing tackle including the lure or bait at the desired depth during trolling operations and when a fish strikes the lure or bait, the fish line is thus automatically released from the trolling weight thereby separating the fishing line from the trolling weight so that the fisherman can play and land the fish with full rod and reel action without the encumberance of the trolling weight 34, which, of course, remains attached to the cable 30 after the fishing line 38 is automatically released so that the trolling weight may be retrieved for subsequent reuse by winding the cable 30 onto the reel 32.

The downrigger 20 may be constructed of any desired or conventional materials having sufficient strength to withstand the forces exerted thereon and is comprised of a generally rectangular, flat base 44, which is adapted to be secured to the deck 22 of the boat 24 through the agency of through bolts (not shown) which project through holes 46 provided in the four corner portions of the base 44 as shown in FIG. 8. A cylindrical stanchion 48 is provided which projects upwardly from the central portion of the base 44, the stanchion 48 being provided with angularly spaced intersecting through passageways 50 and 52 which are open at each end and which are adapted to receive a locking plunger 54 carried by a base housing, generally designated 56. In the preferred embodiment of the invention illustrated, the through passageways 50 and 52 intersect at 90 degree angles whereby the base housing 56 may be mounted on the base 44 in four positions angularly spaced at 90 degrees to facilitate side as well as stern trolling and also permitting the boom 26 to be placed in a forwardly projecting, generally horizontal unobtrusive position when the downrigger is not in use thereby facilitating maneuvering of the boat in close quarters, as for example, during fueling operations at a fueling dock.

The base housing 56 includes upstanding front and rear walls 58 and 60 integrally joined by side walls 62 and 64. The base housing 56 also includes an integral central support section 66 which defines a centrally disposed passageway 68 adapted to receive the stanchion 48 with an easy sliding fit. The left end portion of the plunger 54, as viewed in FIGS. 8 and 9, is adapted to project through a horizontally disposed opening 70 defined by the central portion 66 of the base housing 56 and into one of the passageways 50 or 52 in the stanchion 48 to releasably lock the base housing 56 to the stanchion 48. As shown in FIG. 8, the locking plunger 54 includes an integral collar portion 72 and a central portion 74 which extends through an opening 76 defined by the end wall 60, an enlarged portion 78 of the locking plunger being adapted to bear against the outside surface 80 of the end wall 60 while a knob 82 disposed at the end of the plunger facilitates manual longitudinal movement of the locking plunger. A compression coil spring 84 is also provided which is circumposed on the central portion of the locking plunger, one end of the coil spring 84 bearing against the collar portion 72 of the plunger while the other end of the coil spring 84 bears against the inside surface 86 of the end wall 60. A sleeve 88 is also provided which is disposed around the spring 84 and the collar 72, the sleeve extending between the surface 90 of the central support section 66 and the inner surface 86 of the end wall 60. With such a construction, the locking plunger 54 may be manually retracted by pulling the knob 82 against the action of the spring 84 until the inner end of the plunger is clear of the stanchion 48 and the base housing 56 may be mounted in any one of four positions, spaced at 90 degree angles on the base 44 after which the base housing 56 may be securely locked on the stanchion 48 by inserting the locking plunger 54 in one of the passageways 50 or 52. The locking plunger 54 is, of course, retained in the locked position by the spring 84.

In the preferred embodiment of the invention illustrated, the boom 26 is comprised of two telescoping sections 92 and 94 although it will be understood that any desired number of sections, as for example, three or four sections, may be provided whereby the boom may be extended for any desired length over the transom or sides of the boat. For example, the telescoping boom 26 may be constructed with a sufficient number of sections each of any desired length whereby the boom may be extended through a range of from approximately four feet to approximately fourteen feet beyond the transom or sides of the boat. With such a construction, the downrigger 20 may be utilized under conditions involving rough water or severe wave action without damage to the downrigger or the boat upon which the downrigger is mounted.

As shown in FIG. 6, the upper edge portions 96 and 98 of the side walls 62 and 64 are thickened and terminate above the upper edge of the front wall 58 so that the upper portions of the side walls 62 and 64 define a channel 100 therebetween adapted to receive the rear end portion of the section 94 of the boom 26, the rear end of the channel 100 being closed by the end wall 60 of the base housing 56. A generally J-shaped locking member 102 is provided having a substantially straight shank portion 104 and a reversely bent bight portion 106 terminating in a generally conically shaped end portion 108. In assembling the downrigger 20, the boom 26 is pivotally connected to the base housing 56 by placing the rear end portion of the section 94 of the boom in the channel 100 after which the shank portion 104 of the locking member 102 is inserted through aligned openings 110 and 112 provided in the side walls 62 and 64, respectively, of the base housing 56 as well as through an aligned passageway 114 which extends through section 94 of the boom 26 and through an aluminum plug 115 which is preferably inserted in the tubular section 94 to provide increased bearing area for the shank portion 104 of the locking member. The end portion of the locking member 102 remote from the bight portion 106 thereof is provided with an external thread 116 adapted to receive an internally threaded knob 118. A compression spring 120 is also provided which surrounds the shank portion of the locking member 102, one end of the spring 120 bearing against the outer surface of the wall 62 while the other end of the spring 120 bears against a shoulder 122 at the bottom of a counter bore 124 provided in the adjacent end portion of the knob 118. An enlarged counter bore 126 is also provided in the opposite side of the knob 118 whereby the knob 118 may be retained on the externally threaded shank portion of the locking member 102 by a conventional acorn nut 128. The reversely bent bight portion 106 of the locking member 102 is adapted to project through an opening 130 provided in the side wall 64 and either overlie the outside cylindrical surface of the tubular section 94 of the boom or project into an opening 132 disposed in spaced parallel relationship with respect to the opening 114 in the plug 115 and the tubular section 94 of the boom, the particular position in which the generally conical end portion 108 is positioned being dependent upon the desired position of the boom 26. When it is desired to place the boom 26 in a generally horizontally projecting position for trolling purposes as illustrated, for example, in FIGS. 1, 2, 5, 6 and 10, the lower cylindrical surface of the section 94 of the boom rests on and is supported by an enlarged bearing surface 59 provided on the front wall 58 of the base housing 56 while the generally conically shaped end portion 108 of the locking member 102 overlies the upper cylindrical surface of the section 94 of the boom, the knob 118 being threaded onto the shank portion 104 of the locking member to retain the locking member in such position and also locking the boom 26 in a generally horizontally extending position. On the other hand, when it is desired to lock the boom 26 in a generally vertical position, as illustrated in dotted lines in FIG. 2, and in full lines in FIG. 7, the generally conically shaped end portion 108 of the locking member is inserted in the opening 132 provided in the section 94 of the boom and locked therein by tightening the knob 118 against the outer surface of the side wall 62, the knob 118 being retained in the desired position by the lock washer action of the spring 120.

As shown in FIGS. 1, 2, 4, 10 and 13, a pair of spaced, generally horizontally extending arms 133 and 134 are provided on the base housing 56, the arms 133 and 134 projecting rearwardly from the side walls 62 and 64, respectively, of the base housing. The arms 133 and 134 are preferably formed integrally with the side walls 62 and 64, respectively, and the arms 133 and 134 serve to support the reel 32 for rotation therebetween. The reel 32 includes a hub portion 136 which is mounted on the shank portion 138 of a crank 140 having a conventional crank handle 142. The hub portion 136 of the reel 32 is fixed to the shank portion 138 of the crank by set screws 144 and 146 which threadably engage the hub portion 136 of the reel and fix the hub portion of the reel to the shank portion 138 of the crank when the set screws are tightened thereagainst. The shank portion 138 of the crank is supported for rotation in bearings 148 and 150 carried by the arms 133 and 134, the shank portion 138 of the crank being adapted to be inserted initially through either of the bearings 148 and 150 whereby the crank handle 142 may be disposed on either the right side or the left side of the reel 32 for either right hand or left hand manual operation thereby eliminating the necessity of providing right hand and left hand models of the downrigger.

The central portion 152 of the reel 32 is of generally disc-like configuration and extends radially outwardly from the hub portion 136 of the reel. In the preferred embodiment of the invention illustrated, the central portion 152 is provided with four integral equally angularly spaced, radially extending spokes 154, 156, 158 and 160 defining recesses 162, 164, 166 and 168 therebetween. The reel also includes spaced peripheral flange portions 170 and 172 defining a groove 174 therebetween adapted to receive the cable 30. As shown in FIGS. 10 and 11, means is provided for releasably locking the reel 32, such means being comprised of a locking member 176 having an enlarged inner end portion 178, a reduced diameter central portion 180 disposed within a generally cup shaped retainer 182 and an enlarged collar portion 184 terminating in a knob 186. The retainer 182 is carried by the arm 134, as illustrated in FIG. 11, and the retainer is provided with a transverse groove 188 in the end wall 190 thereof adapted to receive a cross pin 192 extending through the central portion 180 of the locking member. A compression spring 194 is also provided, one end of which bears against the enlarged inner end portion 178 of the locking member while the opposite end of the spring bears against the end wall 190 of the retainer 182. As shown in FIG. 11, when the cross pin 192 is disposed in the groove 188, the enlarged inner end portion 178 of the locking member is disposed in one of the recesses 162, 164, 166 or 168 and is adapted to bear against the side of an adjacent spoke, such as 156, to prevent rotation of the reel 32. However, when the knob 186 is manually pulled outwardly against the action of the spring 194 and rotated so that the pin 192 is moved out of the groove 188 and instead bears against the outer surface of the end wall 190 of the retainer 182, the inner end portion 178 of the locking member moves clear of the spokes 154, 156, 158 and 160, and the reel 32 is then free to rotate about the longitudinal axis of the bearings 148 and 150.

If desired, enlarged openings such as 196 may be provided in the central portion 152 of the reel to reduce the weight thereof. However, the locking member 176 is not intended to and does not enter the openings 196, the locking action being effected when the enlarged inner end portion 178 of the locking member bears against one of the spokes 154, 156, 158 or 160 as previously described, it being understood that the weight of the cable 30 and the trolling weight 34 will tend to hold a spoke against the locking member when the locking member is in the locked position as previously described. Consequently, it is not necessary for a user of the downrigger to align the locking member with an opening in the reel to lock the reel.

As shown in FIGS. 2, 3, 4, 10 and 12, the downrigger 20 incorporates improved means for securely holding a fishing rod during trolling operations and which permits the fishing rod to be easily and quickly released from the downrigger when a fish strikes the lure or bait. Such means is comprised of a boss 198 which is preferably formed integrally with the side wall 64 of the base housing 56 and which defines a cylindrical recess 200 adapted to receive the butt end portion of a fishing rod 36. By way of example, the recess 200 may be approximately two inches in depth and have an inside diameter of approximately two inches. The fishing rod holding means also includes a generally hook shaped retainer 202 defining a recess 204 open at the rear through a passageway 206. The retainer 202 is also preferably formed integrally with the side wall 64 of the housing and, in the preferred embodiment of the invention illustrated, the retainer 202 is disposed above and slightly forwardly of the boss 198, the recesses 200 and 204 thus being aligned on an axis inclined at an angle of approximately 30 degrees with respect to the vertical axis of the base housing 56. By way of example, the retainer 202 may be disposed approximately six inches above the upper surface of the boss 198. With such a construction, during trolling operations, the butt end portion of the fishing rod 36 may be disposed in the recess 200 defined by the boss 198 while an intermediate portion 208 of the handle of the fishing rod bears against the inner surface 210 of the retainer 202. It will be appreciated that during trolling operations, the weight of the line 38 and the terminal tackle, as well as the drag produced thereby as the line 38 and terminal tackle move through the water, will tend to hold the fishing rod tightly against the surface 210 as well as against the inner surface of the boss 198 defining the recess 200. However, when a fish strikes, the fishing rod may be easily and quickly released from the downrigger by lifting the butt end portion of the fishing rod out of the recess 200 and simultaneously moving the intermediate portion 208 of the fishing rod handle rearwardly through the passageway 206, such releasing of the fishing rod requiring a minimum of manual motion and effort on the part of the fisherman.

Figure 14:
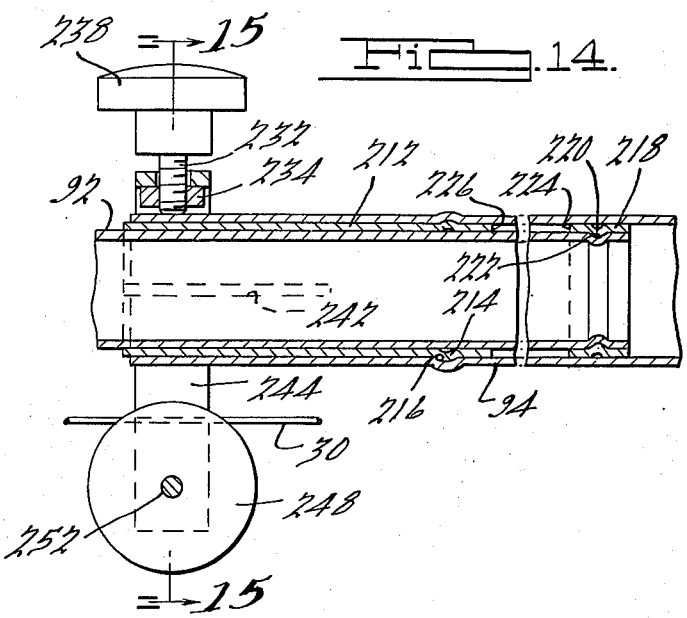
FIG. 14 is an enlarged fragmentary longitudinal sectional view of the central telescoping portion of the downrigger boom illustrated in FIG. 2.

As previously mentioned, in the preferred embodiment of the invention illustrated, the boom 26 is comprised of two telescoping sections 92 and 94, although it will be understood that any desired number of sections may be provided whereby the boom 26 may be extended for any desired length. The sections 92 and 94 are preferably formed of tubular anodized aluminum or other material having sufficient strength to withstand the forces exerted thereon, the sections 92 and 94 being disposed in telescoping relationship as illustrated, for example, in FIGS. 2, 14 and 15. As shown in FIG. 14, the inner end portion of the section 92 of the boom is disposed within a sleeve 212, the sleeve 212 in turn being disposed within the outer end portion of the section 94 of the boom, the sleeve 212 being retained by an outwardly projecting rib 214 which projects into a groove 216 rolled into the periphery of the section 94 at a position near but spaced from the end thereof. Stop means is also provided to prevent withdrawal of the section 92 out of the open end of the sleeve 212, such stop means being comprised of a relatively short tubular sleeve 218 which is secured to the inner end portion of the section 92 through the agency of a rib 220 which projects radially inwardly into a groove 222 provided in the section 92 at a position near the inner end thereof. With such a construction, when the section 92 is pulled outwardly, the edge 224 of the sleeve 218 bears against the edge 226 of the sleeve 212 to prevent further withdrawal of the section 92.

Figure 15:
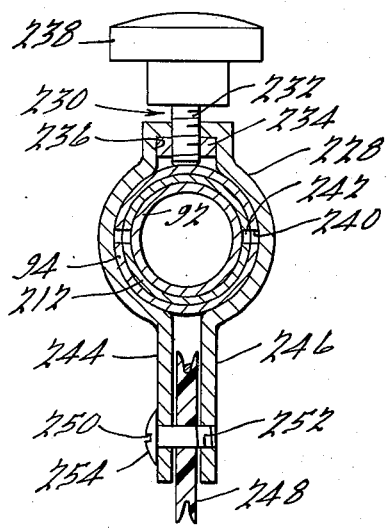
FIG. 15 is a cross-sectional view of a portion of the structure illustrated in FIG. 14, taken on the line 15—15 thereof.

Means is provided for clamping the section 92 at the selected extended position, such means being comprised of a clamp 228 which encompasses the section 94 at a position near the end thereof, the clamp carrying a locking member, generally designated 230 having an externally threaded shank portion 232 which threadably engages a nut 234 disposed in a recess 236 defined by the clamping member 228. As shown in FIGS. 14 and 15, the outer end of the threaded shank portion 232 carries a knob 238 to facilitate rotating the shank portion relative to the nut 234. The outer end portions of the section 94 and the sleeve 212 are preferably provided with elongate slots 240 and 242 to facilitate a collet type locking action when the inner end of the threaded shank portion of the locking member 230 is tightened against the outer surface of the section 94 so as to lock the section 92 of the boom in the selected adjusted position relative to the sleeve 212 and the section 94 of the boom. The clamping member 228 is also provided with depending flange portions 244 and 246 which carry a pulley 248 therebetween, the pulley 248 preferably being formed of nylon and being mounted for rotation on a screw 250 having a shank portion 252 which threadably engages the flange 246 while the head portion 254 of the screw bears against the flange 244. As shown in FIGS. 1 and 2, the pulley 248 serves to guide the cable 30 along the central portion of the boom 26.

Figure 16:
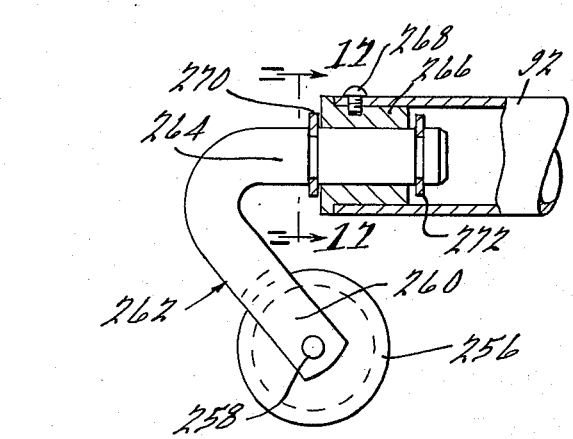
FIG. 16 is an enlarged cross-sectional view of the free end portion of the downrigger boom illustrated in FIG. 2.
Figure 17:
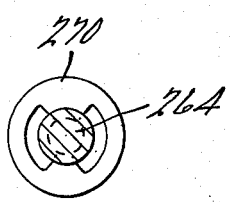
FIG. 17 is a cross-sectional view of the structure illustrated in FIG. 16, taken on the line 17—17 thereof.

The outer end of the section 92 of the boom 26 is provided with a pulley 256 which is also preferably formed of nylon and which is mounted for rotation on a pin 258 carried by one end portion 260 of a generally J-shaped swivel 262. The other end portion 264 of the swivel 262 is mounted for rotation in a bearing cap 266 disposed in the outer end portion of the tubular section 92, the bearing cap 266 being retained by a screw 268 which passes through the tubular section 92 and threadably engages the bearing cap as illustrated in FIG. 16. The end portion 264 of the swivel 262 is retained in the bearing cap through the agency of snap rings 270 and 272 as illustrated in FIG. 16. With such a construction, the swivel 262 is free to rotate in the bearing cap 266 with a caster action as the pulley 256 guides the cable 30. Such a construction prevents jamming of the trolling weight cable 30 during trolling operations, as for example, under conditions involving rolling and yawing as well as pitching of the boat upon which the downrigger 20 is mounted.

In the preferred embodiment of the invention illustrated, the downrigger 20 is also provided with a conventional cable depth counter 274 mounted on a support 276 formed integrally with the arm 133, the counter 274 being driven by a belt 278 entrained on a pulley 280 formed integrally with the hub portion 136 of the reel 32. With such a construction, the user of the downrigger is readily apprised of the length of the cable that has been unwound from the reel 32 during trolling operations.

While a preferred embodiment of the invention has been illustrated and described, it will be understood that various changes and modifications may be made without departing from the spirit of the invention.

What is claimed is:

1. A downrigger comprising, in combination, a base adapted to be secured to a watercraft, a base housing indexably mounted on said base, a boom pivotally mounted on said base housing, a cable reel secured to said base housing in alignment with said boom, means on said base housing for releasably securing a fishing rod thereto, means for releasably locking said base housing to said base in a selected indexed position, said boom including a plurality of sections disposed in telescoping extensible relationship, and means for locking said sections in a selected longitudinal position relative to each other.

2. A downrigger comprising, in combination, a base adapted to be secured to a watercraft, a base housing indexably mounted on said base, a boom pivotally mounted on said base housing, a cable reel secured to said base housing in alignment with said boom, means on said base housing for releasably securing a fishing rod thereto, means for releasably locking said base housing to said base in a selected indexed position, said reel including a plurality of angularly spaced radially extending abutment surfaces, and plunger means carried by said base housing, said plunger means being engageable with a selected one of said abutment surfaces and effective to lock said reel in a selected angular position.

3. A downrigger for use in maintaining terminal fishing tackle at a desired depth in the water, said downrigger including a base adapted to be secured to a watercraft, a base housing indexably mounted on said base, and extensible boom pivotally mounted on said base housing, a cable reel carried by said base housing in alignment with the longitudinal axis of said boom, means for releasably locking said base housing to said base in a selected indexed position, and means for locking said boom in a selected angular position relative to said base housing.

4. The combination as set forth in claim 3, said boom including a plurality of sections disposed in telescoping extensible relationship, means for releasably locking said sections in selected longitudinal positions relative to each other, and a pair of pulleys, one of said pulleys being carried by said boom for pivotal movement about the longitudinal axis of said boom, the other of said pulleys being carried by said means for locking said sections.

5. The combination as set forth in claim 3, and means for releasably securing a fishing rod to said housing including a boss fixed to said housing and defining a socket, and retainer means carried by said housing in vertically spaced angularly disposed relationship with respect to said boss, said retainer means defining a recess communicating with a passageway open in the direction of said boss.

6. A downrigger for use in maintaining terminal fishing tackle at a desired depth in the water, said downrigger including a base adapted to be secured to a watercraft, a base housing indexably mounted on said base, means for releasably locking said base housing to said base in a selected indexed position, an extensible boom pivotally mounted on said base housing, means for releasably locking said boom in a selected angular position relative to said base housing, a cable reel carried by said base housing in alignment with the longitudinal axis of said boom, a pair of pulleys, one of said pulleys being carried by said boom for pivotal movement about the longitudinal axis of said boom, and means for releasably securing a fishing rod to said housing including a boss on said housing defining a socket and retainer means on said housing in vertically spaced angularly disposed relationship with respect to said boss, said retainer means defining a recess communicating with a passageway open in the direction of said boss.

7. The combination as set forth in claim 6, said boom including a plurality of sections disposed in telescoping extensible relationship, and means for releasably locking said sections in selected longitudinal positions relative to each other.

8. The combination as set forth in claim 6, said boom including a plurality of sections disposed in telescoping extensible relationship, means for releasably locking said sections in selected longitudinal positions relative to each other, the other of said pulleys being carried by said means for locking said sections.

9. The combination as set forth in claim 8, said reel including a plurality of angularly spaced radially extending abutment surfaces, and plunger means carried by said base housing, said plunger means being engageable with a selected one of said abutment surfaces and effective to lock said reel in a selected angular position.

10. The combination as set forth in claim 9 including single crank means projecting through said reel, and means for selectively securing said crank means to said reel on opposite sides thereof.

* * * * *